No. 609,787. Patented Aug. 30, 1898.
G. J. CAPEWELL.
WINDOW CLEANER.
(Application filed Aug. 6, 1896. Renewed Jan. 5, 1898.)
(No Model.) 2 Sheets—Sheet 1.
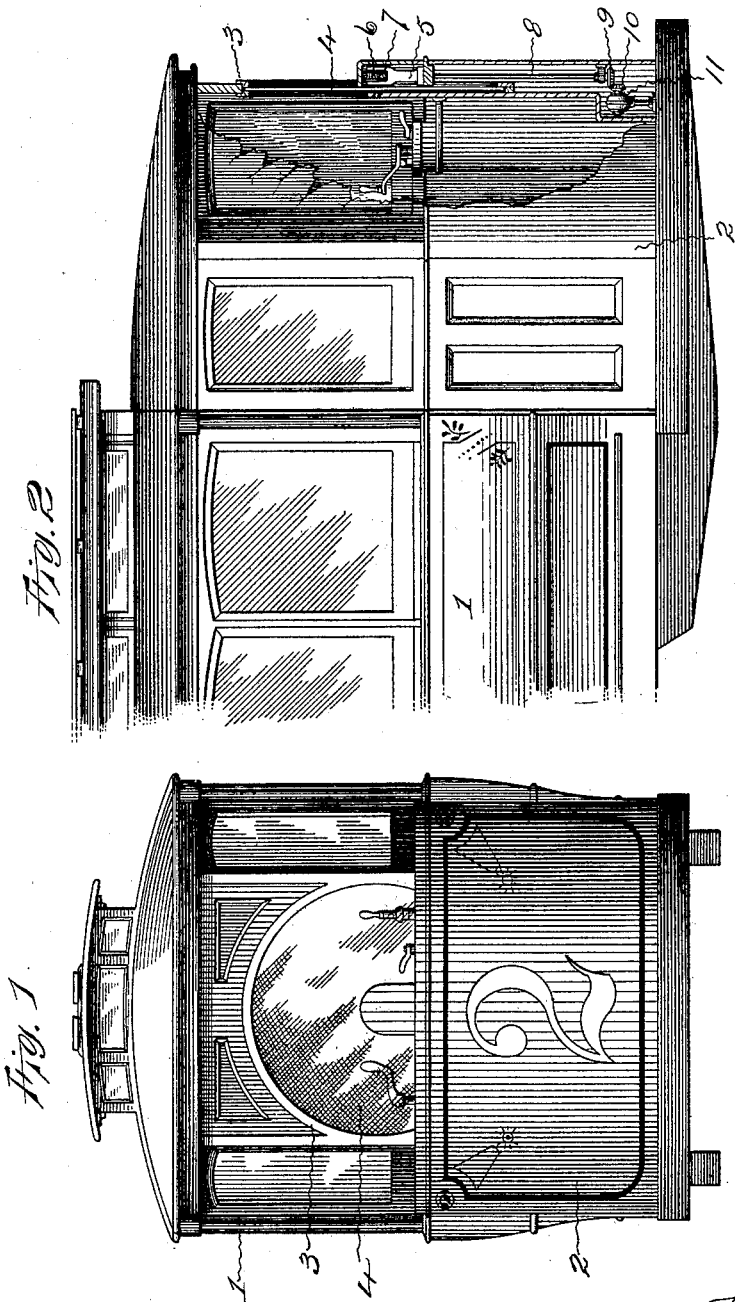
Witnesses:
E. J. Hyde.
C. E. Buckland.
Inventor:
George J. Capewell,
by Harry R. Williams,
atty.
THE NORRIS PETERS CO., PHOTO-LITHO., WASHINGTON, D. C.

No. 609,787. Patented Aug. 30, 1898.
G. J. CAPEWELL.
WINDOW CLEANER.
(Application filed Aug. 6, 1896. Renewed Jan. 5, 1898.)
(No Model.) 2 Sheets—Sheet 2.
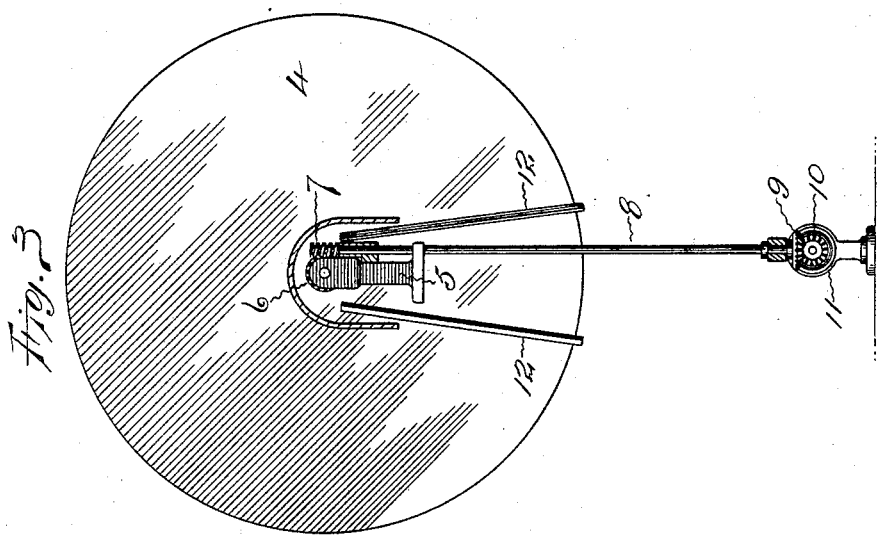

UNITED STATES PATENT OFFICE.

GEORGE J. CAPEWELL, OF HARTFORD, CONNECTICUT.

WINDOW-CLEANER.

SPECIFICATION forming part of Letters Patent No. 609,787, dated August 30, 1898.

Application filed August 6, 1896. Renewed January 5, 1898. Serial No. 665,703. (No model.)

*To all whom it may concern:*

Be it known that I, GEORGE J. CAPEWELL, a citizen of the United States, residing at Hartford, in the county of Hartford and State of Connecticut, have invented certain new and useful Improvements in Windows, of which the following is a specification.

The invention relates to those windows in the cabins, pilot-houses, or conning-towers of merchant-steamers, naval vessels, and similar marine craft and in the vestibules, cabs, and like places of cars, locomotives, and such land-vehicles which are utilized by the pilot, lookout, driver, motorman, or engineer for observing the course, path, or track of the moving vehicle.

The object of the invention is to provide windows for such places and purposes which can be at any time, without interfering with the travel of the vehicle or the duties of the observer, made to automatically clean themselves and keep themselves clear. It is applicable for windows of slow-moving craft; but it is more particularly adapted and intended for windows of rapidly-moving vehicles, such as high-speed locomotives and cars, with which it is necessary that the observer or driver should have a clear view of the path or track.

To this end the invention resides in an observation-window for a vehicle having a glass, wipers for cleaning the surface of the glass, and mechanisms for moving the parts when it is desired to clean the glass of moisture which gathers from fog, mist, or rain, vapor from the breath, or snow, ice, and sleet from a storm, whereby the glass can be retained in position to shelter the observer or driver and yet be kept clean, so that a clear vision may be had through it.

Referring to the accompanying drawings, wherein the invention is illustrated, Figure 1 is a front elevation of the body of an electric car fitted with the invention. Fig. 2 is a side view of the front end of the same with a portion of the vestibule broken away to illustrate the application of the invention. Fig. 3 is a detail enlarged view illustrating the operation of the mechanisms.

In the views, 1 indicates the body of an ordinary electric car, which has a common vestibule 2, containing the controller and brake mechanisms incident to such a vehicle.

The front of the vestibule of the car shown is provided with a circular window-frame 3, which surrounds the edges of a circular pane of glass 4. This glass is mounted on a central arbor and its edges move freely in a groove in the frame. The arbor of the glass is supported by any suitable frame or standard 5, and mounted on the arbor is a worm-wheel 6, meshing with which is a worm 7, that is borne by a shaft 8. The shaft 8 may be provided with a bevel-gear 9, and meshing with this may be a bevel-pinion 10, which pinion may be mounted on or connected with the shaft of the armature of a small motor 11.

The motor can be connected by wires with any suitable part of the circuit that operates the mechanisms of the car. A switch may be located in the circuit-wires leading to the motor within convenient reach of the motorman, so that by turning the switch and cutting in the small motor-circuit the armature will be rotated, and this, through the pinion, gear, shaft, worm, and worm-wheel, will rotate the glass pane.

Wipers 12, preferably formed with flexible india-rubber strips, are placed against the surface of the glass, so as to rub the glass when it is rotated. There are usually two of these wipers, and they can be secured to the frame below the front board of the vehicle or behind the housing surrounding the window in position to be out of sight and in such manner that one will scrape off the heaviest part of the substance collected upon the glass surface as it revolves and the other will rub the surface clean and dry after the greater part of the moisture has been removed.

It is not essential that the glass be circular in form.

Electricity, air, steam, or other power can be employed to move the parts, as is most convenient on the vehicle to which the invention is applied, and the movement could be given, if desired, by connection with one of the axles of the vehicle.

The engineer, driver, motorman, pilot, lookout, or other observer in the cabin, tower, or cab of the vehicle or craft to which one of these windows is applied can at any time set the mechanisms in operation to clean the surface of the glass, so that he may have a clear vision through the glass of the course, path, or track. This is particularly serviceable for vehicles which run at rapid speeds, for ice, snow, sleet, rain, or other moisture can be readily wiped from the outside of the window when the vehicle is running at a high velocity without interfering with the duties of the observer desiring the window cleaned. The use of this apparatus permits the motorman of an electric car or the engineer of a locomotive to keep the front window clear while running during a wet snow-storm, when otherwise he would be required either to open the window and be himself exposed to the weather or to at short intervals reach out and wipe the glass in order to obtain a view of the line.

I claim as my invention—

In combination with a window for moving craft or vehicles, an open frame, a glass movably supported in the frame, wipers held by the frame against the surface of the glass, a motor adapted to be energized by the motive power of the craft or vehicle, and mechanisms connecting the motor with the glass, whereby the glass is moved when the motor is energized, substantially as specified.

GEORGE J. CAPEWELL.

Witnesses:
H. R. WILLIAMS,
E. J. HYDE.